United States Patent [19]

Schwarz

[11] 3,855,466

[45] Dec. 17, 1974

[54] CIRCUIT ARRANGEMENT FOR LINEARIZATION OF THE CHARACTERISTIC OF A SENSOR

[75] Inventor: Karlhans Schwarz, Owingen, Germany

[73] Assignee: Bodenseewerk Geratetechnik GmbH, Uberlingen/Bodensee, Germany

[22] Filed: Jan. 23, 1974

[21] Appl. No.: 435,879

[30] Foreign Application Priority Data

Apr. 5, 1973 Germany ............................ 2317023

[52] U.S. Cl. ............... 250/212, 250/206, 324/99 D, 73/359

[51] Int. Cl. ........................................... H01j 39/12

[58] Field of Search ............ 250/212, 211 J, 206; 324/99 D; 73/359; 307/310, 311; 340/347 SH

[56] References Cited

UNITED STATES PATENTS

| | | | |
|---|---|---|---|
| 3,053,985 | 9/1962 | Grammer, Jr. et al. | 250/212 |
| 3,316,547 | 4/1967 | Ammann | 324/99 D |
| 3,424,908 | 1/1969 | Sitter | 250/211 X J |
| 3,516,002 | 6/1970 | Hillis | 340/347 X SH |

*Primary Examiner*—Walter Stolwein
*Attorney, Agent, or Firm*—Darbo, Robertson & Vandenburgh

[57] ABSTRACT

A photovoltaic cell observes a temperature and produces a current which is applied to one input of a precision comparator. The output signal from the comparator is applied to an integrator. There is a feedback loop from the output of the integrator to the other input of the comparator. In this loop the integrator output signal is converted to digital form and then applied to a read-only memory which has stored in it the characteristic of the cell. The output of the read-only memory is converted back to analog form and through a resistor is applied to the input of the comparator. Thus the signal at the output of the integrator, which is taken off through an output buffer amplifier, represents the temperature seen by the cell, with a high degree of accuracy.

3 Claims, 1 Drawing Figure

PATENTED DEC 17 1974
3,855,466
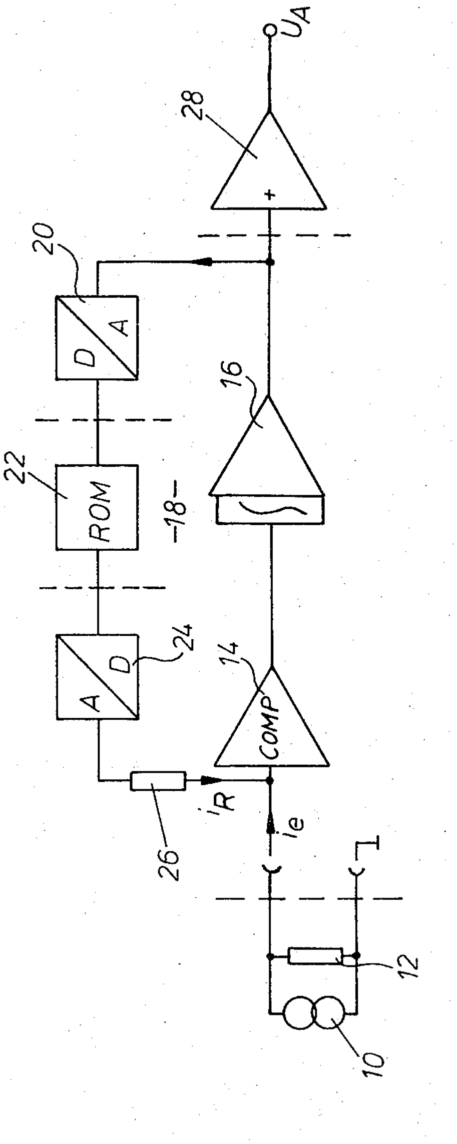

CIRCUIT ARRANGEMENT FOR LINEARIZATION OF THE CHARACTERISTIC OF A SENSOR

BACKGROUND AND SUMMARY OF THE INVENTION

This invention relates to a circuit arrangement for linearization of the characteristic of a sensor apparatus, such as an optical pyrometer, which has an amplifier channel and a non-linear feedback loop.

It is well known that the operating temperature of the turbine blades in turbine engines of aircraft is an important parameter with respect to power and useful life of the turbine. This turbine blade temperature becomes more and more critical the higher is the power per unit volume of the turbine. In the prior art the temperature of the turbine blades has been measured by means of an optical pyrometer. Extreme requirements are made with respect to the accuracy of this pyrometer.

The pyrometer comprises a measuring photovoltaic cell operating substantially as a current source, said cell being impinged upon by the radiation from the spot to be monitored on the turbine blade.

In order to achieve reproducible measured values, the load of this measuring photovoltaic cell must be substantially a short-circuit. Such photovoltaic cells have the characteristic that with infinitely high load resistance the voltage drop across the photovoltaic cell becomes substantially constant independent of the impinging light flux and thus is not suitable as an output signal. With a short-circuit, there will be an unambiguous relation between the electric current generated and the impinging light energy. With finite values of the load resistor, the resistance characteristic of the load is varied in uncontrolled manner due to the fact that the photovoltaic cell has a parallel resistance which can be considered as connected in parallel to the load resistance and which varies considerably with cell temperature.

It is well known to connect the measuring photovoltaic cell to a high gain operational amplifier the input resistance of which can be made nearly zero by an appropriately dimensioned feedback. This results in an output voltage proportional to the output current of the measuring photovoltaic cell, said output voltage being a strongly non-linear, substantially exponential, function of the temperature of the monitored spot of the turbine blade. Therefore, it is necessary to linearize this characteristic.

Analog linearization networks have been used for this purpose. In a prior art arrangement, the measuring photovoltaic cell is connected to an operational amplifier having zero input resistance. The output of this operational amplifier is connected to a further amplifier which has a negative feedback loop including an element non-linear in accordance with the nonlinearity of the measuring photovoltaic cell. This non-linear element is, for example, a diode operating through a voltage divider in the exponential low range of its characteristic. An accuracy of about ± 10° C with a temperature range from 600° C to 1,000° C can be achieved thereby. This accuracy is not sufficient for the monitoring of modern engines. Therefore attempts have been made to further improve the accuracy by using diode resistor networks in the feedback loop of the amplifier. An accuracy of up to ± 2.5° C for the temperature range mentioned can be achieved thereby with a correspondingly increased cost.

In many cases, however, an accuracy of ± 1° C is required.

The attempt could be made to achieve linearization by digital means, namely by converting the analog measured value to a corresponding digital information through an analog-to-digital converter. This digital information can be applied to a read-only memory (ROM) having stored therein a function inverse to the measuring cell characteristic, whereby it produces a digital output proportional to temperature. This digital output can then be converted into an analog signal proportional to temperature by means of a digital-to-analog converter and, for example, can be processed in an automatic control loop through an output buffer amplifier.

A simple consideration shows, however, that this procedure requires a disproportionately high cost in the case discussed of an optical pyrometer comprising a measuring photovoltaic cell having an exponential characteristic. The slopes of the measuring cell characteristic are in the beginning (such as at 600° C) and at the end of the measuring range (such as at 1,000° C) considerably different and have a ratio of about 1 : 100. At low temperatures, a temperature change of 1° C results in only a small change of the measuring cell unit. Thus the analog signal must be resolved into very fine increments, if the required accuracy of 1° C is to be achieved. At the upper end of the measuring range, on the other hand, such a high digital resolution results in detailed digital information, which in this form no longer makes sense. In practice, a digital resolution of the analog measuring cell signal into at least 14 bit would be required, in order to achieve the demanded accuracy. This requires a considerable expenditure, because — as is well known — the expenditure for digitization into more than 8 bit increases with each additional bit more than proportional because of the precision requirements involved.

It is an object of the invention to achieve highly accurate linearization of sensors of this type or similar types with a reasonable cost.

In accordance with the invention, this object is achieved with a circuit arrangement of the type defined in the beginning, in that said feedback loop comprises an analog-to-digital converter, a read-only memory storing the characteristic of the sensor and a digital-to-analog converter.

At the input of the feedback loop the signal, according to definition, is a linear function of temperature. Then the digital resolution of this signal depends on the accuracy required. If 1,000° C are to be measured with an accuracy of 1° C, corresponding to an accuracy of 0.1%, then 10 bits corresponding to 1,024 steps would be sufficient for this. A feedback signal is associated in digital form with each of these steps through the read-only memory. This feedback signal is again converted into a corresponding analog signal by a digital-to-analog converter and is opposed to the sensor signal at the input of the amplifier channel.

The amplifier channel may comprise a comparator having one of its inputs connected to said sensor and an integrator, said feedback loop being connected from the output of said integrator to the other input of said comparator.

Currents from the sensor and the feedback loop are fed to the comparator. It produces an output signal of one polarity or the other depending on which of the currents is larger. Accordingly the output signal of the integrator increases or decreases, and through the feedback loop the input currents to the comparator are made equal.

DESCRIPTION OF THE DRAWING

The drawing is a schematic block diagram of an embodiment of the invention, the individual blocks therein being commercially available integrated circuit elements and being, therefore, not described in detail.

DESCRIPTION OF SPECIFIC EMBODIMENT

Reference numeral 10 designates a sensor cell which is, in the present embodiment, a measuring photovoltaic cell, such as a silicon photovoltaic cell having an accuracy of better than 0.1% of an optical pyrometer and is shown as a current source. The sensor cell 10 has an internal parallel resistance 12 which, in a measuring photovoltaic cell, is strongly dependent on the environmental temperature of the measuring photovoltaic cell.

The output current, i.e., of the sensor cell 10 is applied to the input of a precision comparator 14. This comparator should have an offset drift of less than 0.5 microvolts per degree centigrade and an input resistance of more than $10^7$ ohms. This could be an operational amplifier commercially available from Monolithic Precision Division of Bourns (MONO) Type No. OP-05 or from Analog Devices Type No. 508. The output of comparator 14 is connected to the input of an integrator 16, which may be an operational amplifier having a capacitor in the feedback loop from its output to its inverting input (Miller-integrator). A feedback loop extends from the output of the integrator 16 to the input of comparator 14. This feedback loop contains an analog-to-digital converter 20 with a capacity of preferably 10 bit. This analog-to-digital converter can be, for example, an element commercially available from MONO, i.e., Type No. AD 120. The output of the analog-to-digital converter 20 is applied to a read-only memory (ROM) 22, for example a 10 K bit memory commercially available from Unisem Type No. 2 x UA 3596. The values of the sensor characteristic for each of the 1,024 steps, which are defined by the converter 20 and into which the integrator output signal is resolved, are stored in said read-only memory 22. The digital output information of the read-only memory 22 is applied to a digital-to-analog converter 24 for example a 10 bit converter commercially available from MONO, i.e., Type No. DAC 02. The digital-to-analog converter 24 provides an analog feedback signal, which is applied as current $i_R$ through a resistor 26 also to the input of precision comparator 14.

The overall input resistance of the circuit comprising elements 14 to 24 as "seen" from the photovoltaic cell is substantially an ideal short-circuit. The precision comparator 14 provides output signal of different polarity depending on whether $i_e < i_R$ or $i_R < i_e$. These signals are applied to the input of the integrator 16, the output of which increases or decreases correspondingly, whereby $i_e = i_R$ is maintained. Taking the nonlinear feedback into consideration, the output of the integrator is proportional to the temperature with an accuracy of, for example, ± 1° C. The analog output of the integrator 16 is applied, through an output buffer amplifier 28, as output measuring voltage $U_1$, for example, to a temperature control loop.

I claim:

1. In an electronic apparatus for linearization of the output signal of a sensor having a given characteristic, which apparatus comprises an amplifier channel having an input and an output and a non-linear feedback loop around said channel, the improvement wherein said feedback loop comprises:

- an analog-to-digital converter connected to said output to convert the signals from the channel output to digital form;
- a read-only memory having the characteristic of said sensor stored therein, said memory being connected to said converter to receive said signals in digital form and to produce digital output signals corrected for temperature; and
- a digital-to-analog converter connected to said memory to convert said corrected signals to analog form, said digital-to-analog converter being connected to said channel input to apply said corrected signals in analog form to said input.

2. In an apparatus as set forth in claim 1, wherein said amplifier channel comprises:

- a comparator having two inputs one of which is connected to said sensor and the other of which is connected to the digital-to-analog converter, said comparator having an output; and
- an integrator having an input connected to the comparator output, said integrator having an output forming the amplifier channel output.

3. In an apparatus as set forth in claim 1, wherein the sensor is a photovoltaic cell.

* * * * *